Nov. 4, 1952
G. E. ROWE
2,616,550
GLASSWARE TRANSFER MECHANISM
Filed Feb. 9, 1950
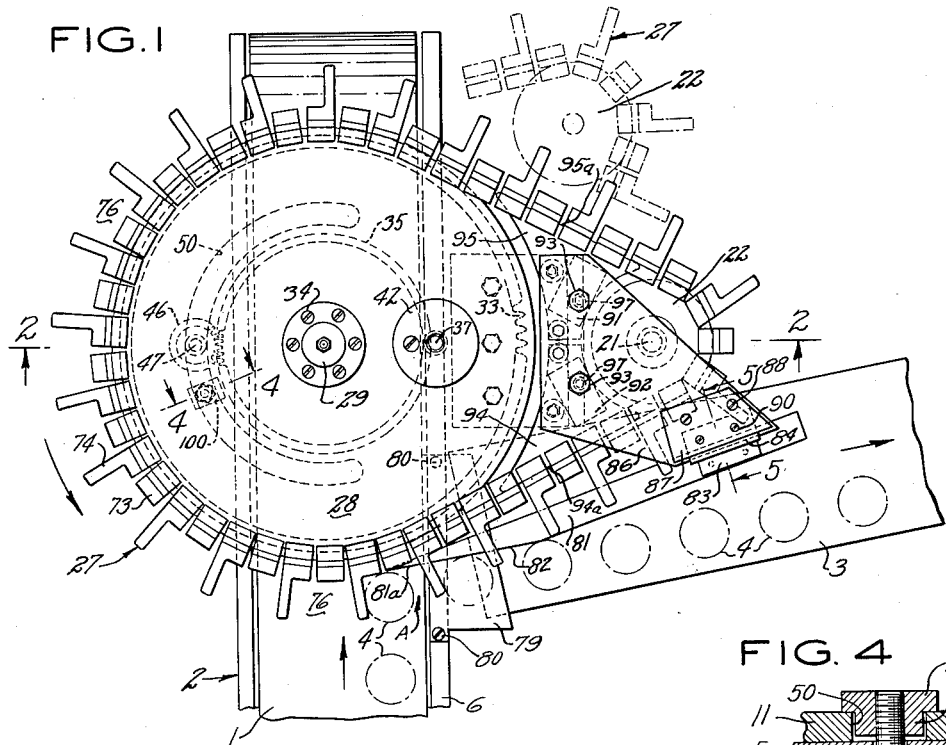
INVENTOR
GEORGE E. ROWE
BY Parham & Bates
ATTORNEYS Patented Nov. 4, 1952

2,616,550

UNITED STATES PATENT OFFICE 2,616,550

GLASSWARE TRANSFER MECHANISM

George E. Rowe, Wethersfield, Conn., assignor to Emhart Manufacturing Company, a corporation of Delaware Application February 9, 1950, Serial No. 143,318

14 Claims. (Cl. 198—20)

This invention relates to improvements in mechanisms for transferring articles of glassware, such as bottles, jars or the like, from one moving horizontal conveyor to a second adjacent moving horizontal conveyor and more particularly to an article transfer device of the character described for transferring articles from the first conveyor onto the second conveyor in a single file, uniformly spaced order.

An object of the invention is to provide an article transfer device of the character described which can be arranged for use to deliver articles from the first conveyor onto the second conveyor in the desired order when the second conveyor is at one side of the first conveyor and at an angle therewith which may vary within a wide range.

A further object of the invention is to provide an article transfer device of the character described which can be adjusted to vary transversely of the second conveyor the position thereon of a row of uniformly spaced articles transferred thereto from the first conveyor.

A further object of the invention is the provision of a transfer device of the character described having an endless, arcuate series of projecting spaced article pusher elements and means for driving them in unison along an endless horizontal path such that each pusher element is given an article transferring stroke across the first conveyor and thence over a portion of the second conveyor during each cycle of the series of pusher elements and a running adjustment is provided between the series of pusher elements and its driving means to adjust the timing of the article transferring strokes of the pusher elements relative to the arrival of articles on the first conveyor at a transfer position.

Other objects and advantages of the invention will hereinafter be pointed out or will become apparent from the following description of a practical embodiment of the invention as shown in the accompanying drawings, in which:

Figure 1 is a plan view of the improved transfer mechanism in position to transfer articles from a moving horizontal first or main conveyor to a moving horizontal second or cross conveyor, only fragmentary portions of the conveyors being shown;

Fig. 2 is a vertical section through the transfer mechanism along the line 2—2 of Fig. 1;

Fig. 3 is a fragmentary plan view of details of a portion of a transfer chain guiding and supporting arrangement, the view being partly in section along line 3—3 of Fig. 2;

Fig. 4 is a relatively enlarged fragmentary vertical section of a clamping device which is included in the structure of the transfer mechanism, the view being along the line 4—4 of Fig. 1; and Fig. 5 is a fragmentary vertical section of elements of an article deflecting guide bar and its support, the view being along the line 5—5 of Fig. 1.

In the drawings, Figs. 1 and 2, the numeral 1 designates a moving horizontal stretch of an article conveyor, generally designated 2, the direction of movement of which is shown by a direction arrow on Fig. 1. This conveyor may be that for conducting glassware from a glassware forming machine (not shown) for transfer to a second or cross conveyor 3 which also is horizontal and is moving in a direction away from the main conveyor as indicated by a direction arrow in Fig. 1. The second conveyor 3 may be intended for use to convey the ware to a glassware stacker (not shown). The ware on the main conveyor stretch is represented by the circles 4 and may be jars, bottles or the like. The articles may be brought in a row to a transfer position indicated generally at A, Fig. 1, whence successive articles will be transferred to the second conveyor by transfer mechanism hereinafter described so as to be disposed in a uniformly spaced single file order on the latter. Of course, the conveyors may be used to convey articles of various descriptions from and to various mechanisms other than those specifically mentioned or for any other useful purpose.

The transfer mechanism comprises a stationary horizontal supporting plate 5, Fig. 2, disposed across and slightly above the upper surface of a portion of the conveyor stretch 1. The stationary supporting plate 5 may be supported in a relatively fixed position in any suitable known manner. In the example shown, it is attached, as by screws 6, to the spaced side rails 7 which are located on a conveyor supporting structure 8 at opposite side edges of the conveyor stretch 1. Uprising from the supporting plate 5 at the approximate center line of the conveyor stretch 1 is a stationary vertical axle or shaft 9 having a flanged base portion 9a secured to the stationary support 5, as by screws 10. The supporting plate 5 may be circular, although this is not essential, and the location of the upright member 9 then preferably is at the center of the supporting plate.

A flat rotationally or angularly adjustable positioning disc 11 rests flatwise on the supporting plate 5 in concentric relation therewith and has a central opening 12 accommodating the base portion 9a of the upright member 9.

The positioning disc 11 has a bracket 13 thereon at one side of its center line and extending beyond the edge of the positioning disc at one side of the main conveyor stretch 1. The bracket 13 has an upturned, transversely extending rib 14 thereon located outwardly from the edge of the positioning disc to which the bracket 13 is fastened by cap screws 15 or other suitable known fastening means. The rib 14 carries a pair of outwardly projecting, horizontally spaced supporting pins 16, best seen in Fig. 3, the inner end portions of which may be fastened in openings 17 formed through the bracket rib 14, as by screws 18. Mounted slidably on the projecting pins 16 is a slide block 19 having a suitably bushed vertical bore 20 in its outer end portion to accommodate an upwardly and downwardly projecting rotatable short vertical shaft 21. A circular disc 22 is secured to the upper end portion of shaft 21, suitable spacer washers, as indicated at 23, being provided on the shaft between the disc 22 and the upper surface of the block 19 if needed. The disc 22 serves as a guiding and supporting idler disc for the projecting portion of an endless article transfer chain, hereinafter to be described. A similar disc, indicated at 24, may be provided on the lower end portion of the shaft 21 to aid the disc 22 in guiding the engaged portion of the transfer chain. A coil spring 25 projects from a pocket 26 in the inner end of the block 19 against the bracket rib 14.

The aforesaid transfer chain is generally indicated at 27, Figs. 1 and 2. A main transfer chain supporting and guiding disc 28 which is of the same diameter as the positioning disc 11 is mounted on a hub 29 which fits over the upstanding axle or shaft 9 on the stationary support 5. As shown in Fig. 2, the hub 29 has an external flange 30 overlying the apertured central portion 31 of the disc 28 which in turn rests upon an upward axial projection 32 on a disc sprocket 33 which also is mounted on the hub and is slightly smaller than the discs 11 and 28, both the sprocket 33 and the disc 28 being fastened to the hub flange 30 by cap screws 34 or the like. The sprocket 33 overlies a bull gear 35 which is loose on the lower end portion of the hub 29. The bull gear rests upon the positioning disc 11. A small, toothed adjusting and clutch element 36 is fast on the lower end of an adjusting shaft 37 which extends upwardly through an opening 38 in the sprocket 33 and through the bore 39 of a bushing 40 which is secured in place in an opening 41 in the disc 28. The projecting upper end of shaft 37 carries a pinned or otherwise secured knob or handle 42 resting upon the head of the bushing. A spring pressed detent pin 43 is slidably disposed in a pocket 44 in the knob 42 and tends to project downwardly therefrom against the head of the bushing so as to enter and engage with any one of a number of angularly spaced detent recesses 45 in the head of the bushing. The arrangement is such that the knob 42 and the shaft 37 normally are fixed to the bushing and to the disc 28 by the detent 43. By manually grasping and forcibly turning the knob 42, the disc 28 and sprocket 33 may be adjusted angularly as a unit around the bull gear 35 for a purpose presently to be described. On cessation of turning of the knob 42 so that the detent falls into an underlying recess 45 in the bushing 40, the disc 28 and sprocket 33 will be locked to the bull gear 35 to rotate therewith.

The bull gear 35 is driven by a pinion 46 on the upper end of a vertical driven shaft 47 which extends through and projects above a bushing 48 which is mounted in an apertured portion 49 of the stationary supporting plate 5. The bushing 48 extends through an arcuate slot 50 in the positioning disc 11. The shaft 47 depends through a tubular housing 51 which is suspended at 52 from the stationary supporting plate 5. A driven bevel gear 53 is fast on the lower end of the shaft 47 and is in mesh with a bevel gear 54 on a short horizontal shaft 55 which is journaled in suitable bearings 56 and 57, respectively, in the lower ends of down-turned integral supporting arms 58 and 59, respectively, on the housing 51. The shaft 55 is driven from a sprocket 60 which is loose thereon and is pinned to a sleeve 61 having an arm 62 carrying a detent holder 63 provided with a spring-loaded detent 64 engageable with any one of a plurality of notches or other recesses 65 in the periphery of a detent disc 66 which is keyed at 67 to the shaft 55. The sprocket 60 may be driven by suitable driving means (not shown) in synchronism with the main conveyor 2. If subjected to an overload, the detent 64 will ride out of its recess in the periphery of the clutch disc 66 so as to break the driving connection between the driving means and the driven transfer chain.

The transfer chain 27 includes a driven carrier chain 68 trained about and in driven engagement with the sprocket 33. This chain, which otherwise may be of generally conventional link type construction, is provided with a series of vertically disposed carrier bars 69 which are fastened to its links, as by upper and lower small angle brackets or other attaching devices 70 and 71, respectively. These may be welded or otherwise rigidly secured to the links of the carrier chain and the bars 69 may be firmly, although detachably, fastened thereto, as by fastening devices 72. The series of carrier bars 69 carries a series of alternating filler blocks 73 and pusher blocks 74, respectively. The blocks 73 and 74 are secured by conventional fastening devices 75 to their individual supporting carrier bars so that there is a series of alternating filler blocks 73 and pusher blocks 74 extending completely around the outer side of the carrier chain. The blocks 74 have projecting pusher elements, each of which, in the example shown, consists of three vertically spaced projecting fingers 74a, 74b and 74c, respectively, as best seen in Fig. 2. It is obvious that these pusher blocks may vary considerably from the example shown in general configuration, number, shape and size of their finger portions, etc. The arrangement of the alternating filler and pusher blocks provides a series of open pockets 76 on the transfer chain, each of these pockets being adapted to receive one of the articles to be transferred. The pocket may be substantially wider than the article since the lateral transfer movement of an article entering a pocket at the transfer station A, Fig. 1, will be caused by the pushing of such article laterally off the main conveyor stretch by the projecting pusher element which forms the trailing side of that pocket.

The carrier bars 69 have inwardly turned supporting lugs or portions, as indicated at 69a, at their upper ends for supporting the transfer chain at the desired level on the cooperative main supporting and guiding disc 28 and smaller spaced supporting and guiding disc 22 when the transfer chain is trained about both the assembly of larger discs 28, 33, and 11 and the spaced outbaord assembly of discs 22, 24 as shown jointly by Figs. 1 and 2. The transfer chain is kept desirably taut by the outward pressure of the compressed coil spring 25 on the block 19 and will be driven along an endless path around the assemblies of discs aforesaid by the engagement of the sprocket 33 with the driven carrier chain 68. The inner surfaces of the carrier bars 69 will bear adjacent to their upper ends against the peripheral edges of cooperative discs 28 and 22 and adjacent to their lower ends against similarly cooperative discs 11 and 24 so that the transfer chain will be firmly supported and guided during its travel.

The mechanism as described so far is adapted to push successive articles 4 arriving at the transfer station A from the main conveyor stretch 1 across a dead plate 79 onto the secondary conveyor 3. The dead plate 79 may be appropriately attached to the adjacent conveyor side rail 6, as by screws 80, the conveyor rail being partially cut away to lower the dead plate to the same level as the conveyor stretch 1 as is customary. When each of the articles 4 has been moved by the transfer chain from the main conveyor stretch 1, it may be stripped from its pocket by an adjustably positioned, stationary article deflector bar 81 having a pointed end portion 81a projecting across the dead plate into each oncoming pocket between vertically spaced fingers of the pusher block projections. Obviously, the continued movement of the transfer chain after contact of an article in a pocket thereof with a longtiudinally extending beveled outer side edge or cam surface 82 of the bar 81 will cause that article to ride along the cam surface until it has moved out of the pocket and beyond the extremity of the active pusher element. The article thus is moved onto the secondary conveyor 3 by which it will thereafter be carried.

Since the pockets are spaced uniformly apart, successive articles of the row on the secondary conveyor will be precisely and uniformly spaced in a single row. This row preferably is located on the secondary conveyor near the side thereof remote from the transfer chain so that if any article should be upset it will fall from the secondary conveyor and not remain thereon. However, the row of moving articles on the conveyor 3 may be located elsewhere transversely of such conveyor by individual adjustment of the position of the deflector bar 81 without angular adjustment of the projecting transfer chain guiding and supporting means 22—24 or by a combination of such adjustments. As shown, Figs. 1 and 5, a vertically edgewise longitudinally extending short suspension bar 83 is secured on the upper side of the butt end portion of the stripper bar 81. One leg 84a of a supporting angle bracket 84 is attached to the bar 83. The other leg, indicated at 84b, of this attaching bracket fits in a shallow clamping space 85 between a supporting plate 86 and an overlying spaced top plate 87, the latter being fastened, as by screws 88 extending through a narrow interposed spacing strip 89 into the plate 86 at the rear of the space 85. The bracket part 84b may be removably clamped in adjusted position in the space 85, as by set screws 90 threaded through the top plate 87 and tightened against the part 84b. The set screws 90 may be loosened and the bar 81 moved within limits toward or away from the edge of the supporting plate 86 and hence adjusted relative to the far side edge of the conveyor 3. Similarly, the angle bracket 84 may be adjusted longitudinally in the space 85 to adjust the position of the pointed end 81a of the deflector bar relative to the main conveyor stretch 1. Further adjustments of the position of the stripper bar may be effected by bodily adjustment of the plate 86. The plate 86 is supported in a relatively elevated position above the guiding disc 22 upon spaced blocks 91 and 92, respectively, Figs. 1 and 2, to which it is fastened by cap screws 93. The blocks 91 and 92 are formed integrally with or otherwise provided on a pair of suitably configured generally triangular plates 94 and 95, respectively, which are fastened, by fastening elements 96 to the top of the bracket rib 14 so that they are positioned in the space defined by the adjacent peripheral edges of discs 28 and 22 and the portions of the transfer chain extending between these discs. The fastening elements 93 extend through oversize holes 97 in the plate 86 so that by loosening them, the entire plate and the bar 81 fastened thereto may be turned angularly within limits in its plane so as to adjust the position of the deflector bar 81 in respect to the associate conveyors. The outer side edges, 94a and 95a, respectively, of filler plates 94 and 95 serve to guide and support adjacent portions of the transfer chain in the same manner as peripheral edges of discs 28 and 22.

The positioning disc 11 and the parts carried thereby may be adjusted angularly about the axis of the post 9 suitably to position the laterally projecting portion of the transfer chain so that it will transfer articles from the main conveyor 1 onto a secondary conveyor having any one of different angular relationships with the main conveyor within a range of nearly 135° from parallelism. Thus, the projecting portion of the transfer chain may have been turned counter-clockwise from the full line position shown in Fig. 1 to the dotted line position shown in the same view or turned angularly in either of opposite directions to position it in any one of a great many angularly different positions. The positioning disc 11 then is locked securely to the supporting plate 5 by tightening a bolt 98 which extends through an opening 99 in the supporting plate 5 and engages a shouldered nut 100 having a reduced lower portion 101a fitting slidably in the arcuate slot 50 in the positioning plate 11. See Figs. 1 and 4. It, of course, will be understood that an appropriate dead plate, like plate 79, will be provided between the conveyors when they are at any possible and desired angle with each other.

If the secondary or cross conveyor should be located at the opposite side of the main conveyor from that shown in Fig. 1, the transfer mechanism may be adapted for use simply by initially disposing the positioning disc 11 in an appropriate position to project the bracket 13 laterally of the main conveyor at the opposite side thereof from that shown in Fig. 1 and by operatively positioning the driving mechanism and a suitable dead plate at such opposite sides also. Any structural changes involved are obvious so that the transfer mechanism may operate either at the right hand or left hand side of the main conveyor.

In the event that the main conveyor should bring articles to the transfer position A, Fig. 1, so that they fail to enter the pockets as desired but strike the outer ends of the projecting pusher elements, a running adjustment of timing between the transfer chain and its driving mechanism to eliminate this difficulty may be made by manipulation of the handle 42 in the manner hereinbefore described.

Many changes in and modifications of the illustrative embodiment of the invention shown in the accompanying drawings and herein particularly described will now be obvious to those skilled in the art and I, therefore, do not wish to be limited to the details of this embodiment.

I claim:

1. Mechanism for transferring articles, such as glass jars or the like, from one rectilinearly moving horizontal conveyor to a second adjacent rectilinearly moving horizontal conveyor at one side of the first conveyor comprising an endless carrier chain and spaced outwardly projecting article pusher elements on the carrier chain, means to support and guide said transfer chain for movement along a closed horizontal path such that a portion of the carrier chain extends across adjacent portions of said two conveyors and the projecting pusher elements thereon are disposed at a suitable level above said conveyors to push articles of the character described from a transfer position on the first conveyor toward the second conveyor when said transfer chain is driven in one direction along its path of movement, means to thus drive said carrier chain, a dead plate positioned between said conveyors over which said articles will be pushed by said pusher elements, an article stripper bar, and means to position said stripper bar to contact each of successive articles being moved by the projecting pusher elements of said transfer chain from said first conveyor toward the second conveyor and to guide such articles outwardly beyond the extremities of said pusher elements when they have been pushed onto the second conveyor.

2. Article transfer mechanism as described by claim 1 wherein said second conveyor extends at a predetermined angle to the first conveyor and the means to position the stripper bar is adjustable to adjust the stripper bar bodily as a whole relative to the second conveyor in a plurality of different directions.

3. Article transfer mechanism as described by claim 2 wherein said means to position the stripper bar comprises a horizontal supporting plate mounted for limited adjustment in its plane relative to the second conveyor in any direction and clamping means rigidly to secure the stripper bar to said supporting plate.

4. Article transfer mechanism as described by claim 3 wherein said clamping means is constructed and arranged to permit limited bodily longitudinal and lateral adjustments of the stripper bar relative to its supporting plate.

5. Article transfer mechanism as described by claim 1 wherein the means to support and guide said transfer chain comprises a plurality of horizontally spaced chain supporting and guiding elements and means to mount said elements to permit individual angular bodily adjustment of one of them relative to the other.

6. Article transfer mechanism as described by claim 1 wherein the means to support and guide said transfer chain comprises two horizontally spaced discs in supporting and guiding relation to different portions of said chain and supporting and positioning means for said discs constructed and arranged to permit bodily adjustment of one of said discs angularly about the vertical axis of the other.

7. Article transfer mechanism for transferring articles, such as glass jars or the like, from one horizontal conveyor to a second horizontal conveyor at one side of the first conveyor comprising an endless carrier chain and spaced outwardly projecting article pusher elements on the carrier chain, means to support and guide said transfer chain for movement along a closed horizontal path such that a portion of the carrier chain extends across adjacent portions of said two conveyors and the projecting pusher elements thereon are disposed at a suitable level above said conveyors to push articles of the character described from a transfer position on the first conveyor toward the second conveyor when said transfer chain is driven in one direction along its path of movement, means to thus drive said carrier chain, a dead plate positioned between said conveyors over which said articles will be pushed by said pusher elements, an article stripper bar, and means to position said stripper bar to contact each of successive articles being moved by the projecting pusher elements of said transfer chain from said first conveyor toward a second conveyor and to guide such articles outwardly beyond the extremities of said pusher elements when they have been pushed onto the second conveyor, said means to support and guide said transfer chain comprising two horizontally spaced discs in supporting and guiding relation to different portions of said chain and supporting and positioning means for said discs constructed and arranged to permit bodily adjustment of said discs angularly about the vertical axis of the other, and comprising a rotatably adjustable positioning disc having a relatively fixed position above the first conveyor and coaxial with one of said first named discs, a bracket fixed to said positioning disc to project beyond the edge thereof at the same side of the first conveyor as the second conveyor and adjacent to the latter, and means mounted on the projecting end of said bracket to support the second of the first named discs.

8. Article transfer means as described by claim 7 wherein the means mounted on the projecting end of said bracket to support the second of said first named discs comprises a block carrying that disc and slidably supported on said bracket for movements relative thereto and toward or away from the positioning disc and spring means disposed between said block and said bracket yieldingly to urge said block and the disc carried thereby outwardly to maintain said transfer chain taut.

9. Article transfer means as described by claim 8 wherein said means to support and guide said transfer chain also comprises a pair of plates supported on said bracket in relatively fixed positions between the portions of the transfer chain extending between said two horizontally spaced discs and in supporting and guiding relation to said portions of said chain.

10. Article transfer means as described by claim 1 wherein the means to drive the transfer chain includes a driving element operating in repeated cycles and means to effect a running phase adjustment between the chain and said driving element.

11. In an article transfer mechanism of the character described, a stationary supporting plate, an axle upstanding thereon and fixed thereto, a positioning disc supported on said supporting plate for angular turning adjustment around said axle, said positioning plate having an arcuate slot therein concentric with said axle, a bull gear loose on said axle and resting upon said positioning disc, a sprocket loose on said axle and above said bull gear, said sprocket having a diameter slightly less than said positioning disc, a transfer chain supporting and guiding disc loose on said axle above the sprocket and co-axial with and of the same diameter as the positioning disc, means fastening said last named disc to said sprocket to rotate therewith, means operatively connecting said last named disc with said bull gear so that such disc and the sprocket will rotate in unison with the bull gear, driving means for rotating the bull gear comprising a vertical shaft rotatably supported by said supporting plate in position to extend outwardly through said arcuate slot in the positioning disc, a pinion fast on the upper end of the vertical shaft and in mesh with said bull gear, and means to rotate said vertical shaft, releasable means extending through said arcuate slot to fasten said positioning disc to said stationary supporting plate, and a transfer chain comprising a link type driven carrier chain operatively engaged with said sprocket, carrier plates on the outer side of said carrier chain having inwardly turned upper end portions supported on the supporting and guiding disc and in guided contact above and below the carrier chain with the peripheral edges of the supporting and guiding disc and the positioning disc, respectively, and article contact elements removably secured to the outer sides of said carrier plates.

12. The sub-combination described by claim 11 wherein said article contact elements comprise alternating filler blocks and article pusher blocks respectively secured to alternate carrier plates.

13. The sub-combination described by claim 11 wherein the means operatively connecting the chain supporting and guiding disc with said bull gear comprises an individually rotatable shaft carried by such disc adjacent to the periphery of the bull gear, a toothed clutch element on such shaft bearing against the periphery of the bull gear to co-act therewith to turn the connected disc and sprocket as a unit relative to the bull gear when the shaft is rotated individually about its axis and to turn such disc and sprocket with the bull gear when the shaft is held against rotation about its own axis and the bull gear is rotated, a handle fixed to said individually rotatable shaft, and releasable means to latch said handle to said supporting and guiding disc.

14. In an article transfer mechanism of the character described, a stationary supporting plate, an axle upstanding thereon and fixed thereto, a positioning disc supported on said supporting plate for angular turning adjustment around said axle, said positioning plate having an arcuate slot therein concentric with said axle, a bull gear loose on said axle and resting upon said positioning disc, a sprocket loose on said axle and above said bull gear, said sprocket having a diameter slightly less than said positioning disc, a transfer chain supporting and guiding disc loose on said axle above the sprocket and co-axial with and of the same diameter as the positioning disc, means fastening said last named disc to said sprocket to rotate therewith, means operatively connecting said last named disc with said bull gear so that such disc and the sprocket will rotate in unison with the bull gear, driving means for rotating the bull gear comprising a vertical shaft rotatably supported by said supporting plate in position to extend upwardly through said arcuate slot in the positioning disc, a pinion fast on the upper end of the vertical shaft and in mesh with said bull gear, and means to rotate said vertical shaft, releasable means extending through said arcuate slot to fasten said positioning disc to said stationary supporting plate, a laterally projecting bracket on the positioning disc, an outwardly spring pressed block supported on the outer end of said bracket, a vertical shaft journaled in said block, a pair of outboard discs respectively fast on the upper and lower ends of such shaft, the upper of these discs lying in the plane of the aforesaid transfer chain supporting and guiding disc and the lower lying in the plane of the positioning disc, and a transfer chain comprising an endless link type carrier chain having a driven engagement with said sprocket and a series of carrier plates secured to the outer side of the chain and trained about the co-axial first named supporting and guiding disc and positioning disc and the outboard discs, said carrier plates having inturned upper end portions overlying peripheral edge portions of said first named supporting and guiding disc and the upper of the outboard discs, and blocks detachably secured to the outer sides of said carrier plates, alternate blocks having projecting article pusher elements thereon.

GEORGE E. ROWE.

REFERENCES CITED

The following references are of record in the file of this patent:

UNITED STATES PATENTS

| Number | Name | Date |
|---|---|---|
| 1,036,778 | Baker | Aug. 27, 1912 |
| 1,941,152 | Noll | Dec. 26, 1933 |
| 1,998,093 | Oslund | Apr. 16, 1935 |
| 2,359,252 | Seibert | Sept. 26, 1944 |